United States Patent [19]

Chen

[11] Patent Number: 5,704,581

[45] Date of Patent: Jan. 6, 1998

[54] ANGLE ADJUSTING DEVICE FOR AN INSTRUMENT PANEL

[76] Inventor: Ping Chen, No. 29, Nanmei St., Nantun Li, Nantun Dist., Taichung, Taiwan

[21] Appl. No.: 708,012

[22] Filed: Aug. 30, 1996

[51] Int. Cl.[6] .................................................. A47G 29/00
[52] U.S. Cl. ................. 248/371; 248/292.12; 248/181.2; 248/398; 482/54
[58] Field of Search .................. 248/482, 475.1, 248/477, 479, 496, 917, 918, 919, 920, 923, 423, 181.2, 183.1, 183.4, 186.2, 371, 349.1, 179.1, 288.31, 288.51, 284.1, 292.12, 299.1; 482/54; 74/527

[56] References Cited

U.S. PATENT DOCUMENTS

| | | | |
|---|---|---|---|
| 4,591,123 | 5/1986 | Bradshaw et al. | 248/349 |
| 4,858,864 | 8/1989 | Thompson | 248/178 |
| 5,379,274 | 1/1995 | Lee | 368/317 |
| 5,518,216 | 5/1996 | Wu | 248/371 |
| 5,518,471 | 5/1996 | Hettinger et al. | 482/54 |

Primary Examiner—Leslie A. Braun
Assistant Examiner—Charles J. Hunter
Attorney, Agent, or Firm—Heller Ehrman White & McAuliffe

[57] ABSTRACT

An angle adjusting device includes an adjusting plate fixedly mounted on a bottom wall of an instrument panel and having a convex portion with a first side facing the bottom wall of the instrument panel and a second side. A plurality of first teeth are arranged on the second side of the convex portion. Two spaced elongate slots are each defined in the convex portion. A supporting socket is pivotally mounted on the adjusting plate and includes a concave portion mating with the convex portion. A plurality of second teeth are arranged on the concave portion and mesh with each of the plurality of first teeth. Two spaced blocks each protrude from the concave portion and each slidably extend through a corresponding one of the two elongated slots. A positioning plate abuts on the first side of the convex portion and is fixedly mounted on the two blocks for fastening the adjusting plate on the supporting socket.

7 Claims, 5 Drawing Sheets 5,704,581

ANGLE ADJUSTING DEVICE FOR AN INSTRUMENT PANEL

FIELD OF THE INVENTION

The present invention relates to an angle adjusting device, and more particularly to an angle adjusting device for an instrument panel of an exercise machine.

BACKGROUND OF THE INVENTION

A conventional instrument panel of an exercise machine is shown in FIG. 5, however, there still remain shortcomings therein. There will be a complete illustration in the detailed description of the preferred embodiments, concerning the conventional instrument panel.

The present invention has arisen to mitigate and/or obviate disadvantages of the conventional instrument panel.

SUMMARY OF THE INVENTION

In accordance with one aspect of the present invention, there is provided an angle adjusting device comprising an adjusting plate fixedly mounted on a bottom wall of an instrument panel and having a convex portion with a first side facing the bottom wall of the instrument panel and a second side. A plurality of first teeth are arranged on the second side of the convex portion. Two spaced elongate slots are each defined in the convex portion and are each located adjacent to the plurality of first teeth.

A supporting socket is pivotally mounted on the adjusting plate and includes a concave portion mating with the convex portion. A plurality of second teeth are arranged on the concave portion and meshes with each of the plurality of first teeth. Two spaced blocks each protrude from the concave portion, each located adjacent to the plurality of second teeth and each slidably extends through a corresponding one of the two elongated slots.

A positioning plate abuts on the first side of the convex portion and is fixedly mounted on the two blocks for fastening the adjusting plate on the supporting socket.

Further features of the present invention will become apparent from a careful reading of the detailed description provided hereinbelow, with appropriate reference to the accompanying drawings.

DETAILED DESCRIPTION OF THE PREFERRED EMBODIMENTS

Figure 5:
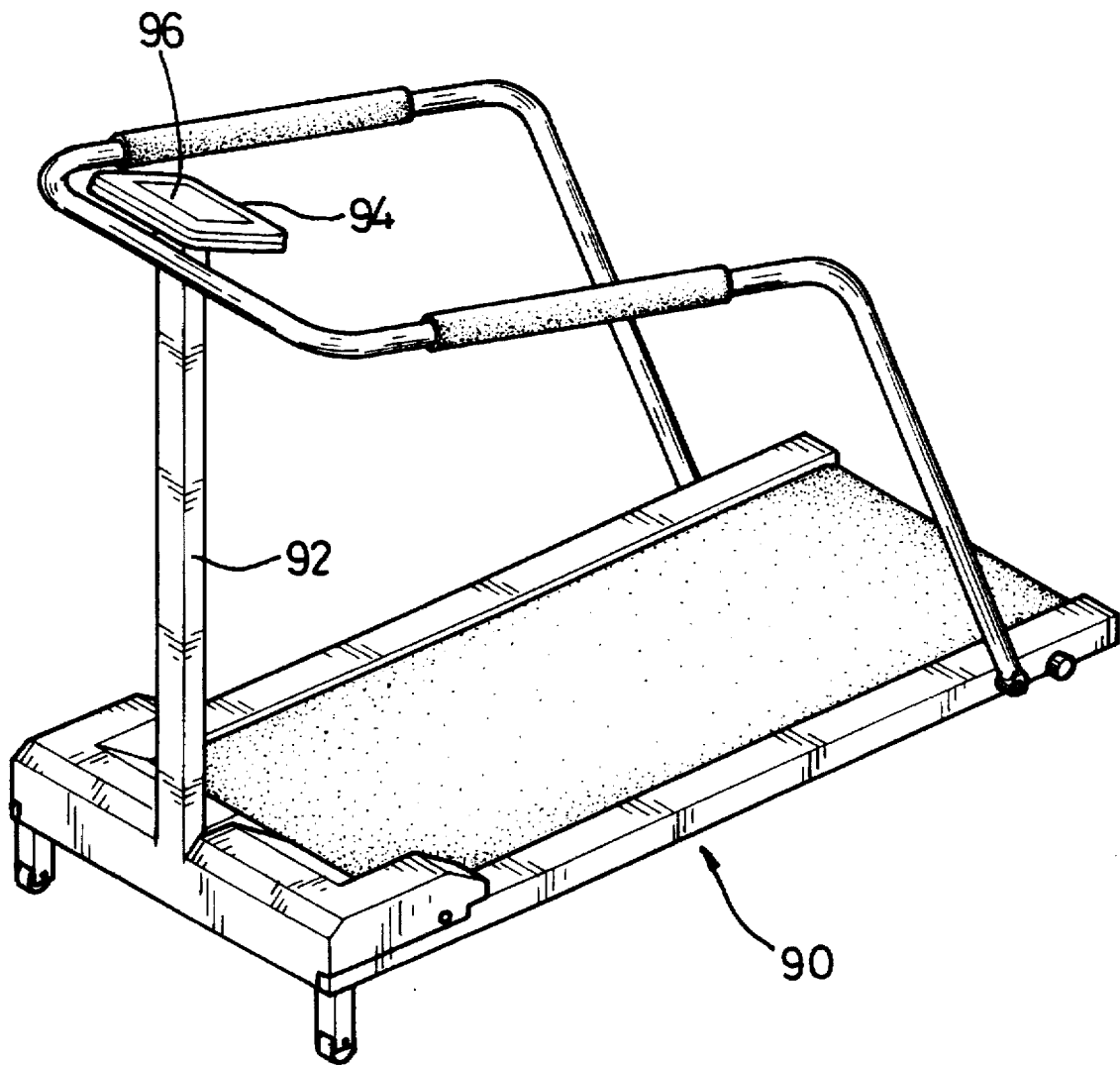
FIG. 5 is a perspective view of a conventional instrument panel fitted to an exercise machine and in accordance with the prior art.

For a better understanding of the present invention, reference is made to FIG. 5, illustrating a conventional instrument panel 94 in accordance with the prior art.

The instrument panel 94 is fixedly mounted on an upright post 92 of an exercise machine such as a running practicing machine 90 and has a display monitor 96 mounted thereon.

By such an arrangement, however, the instrument panel 94 is fixedly fitted on the upright post 92 in an inclined manner without a possibility of adjusting an inclined angle thereof such that such an instrument panel 94 cannot suit users of different stature, thereby greatly limiting the versatility thereof.

Figure 1:
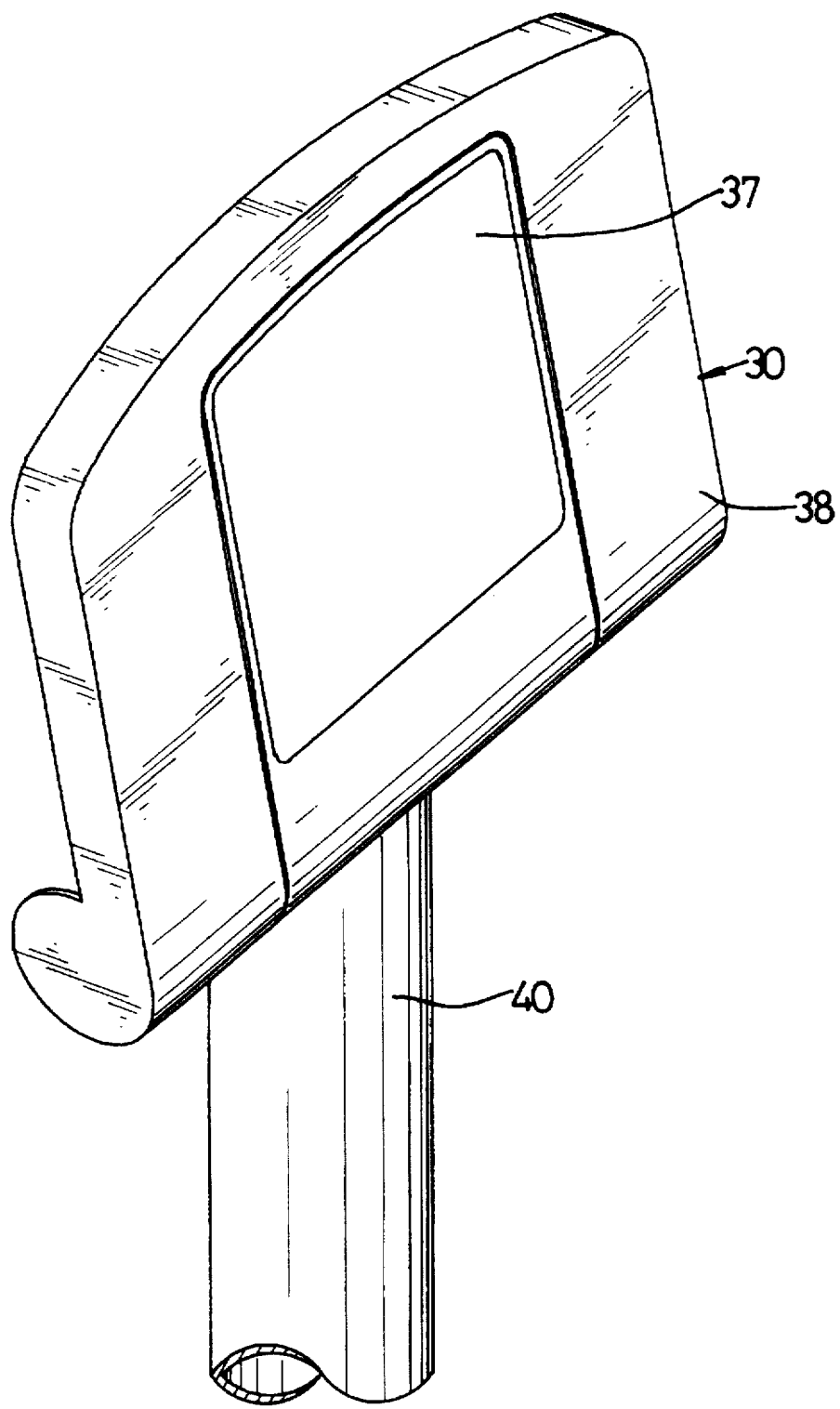
FIG. 1 is a perspective view of an instrument panel in accordance with the present invention.
Figure 2:
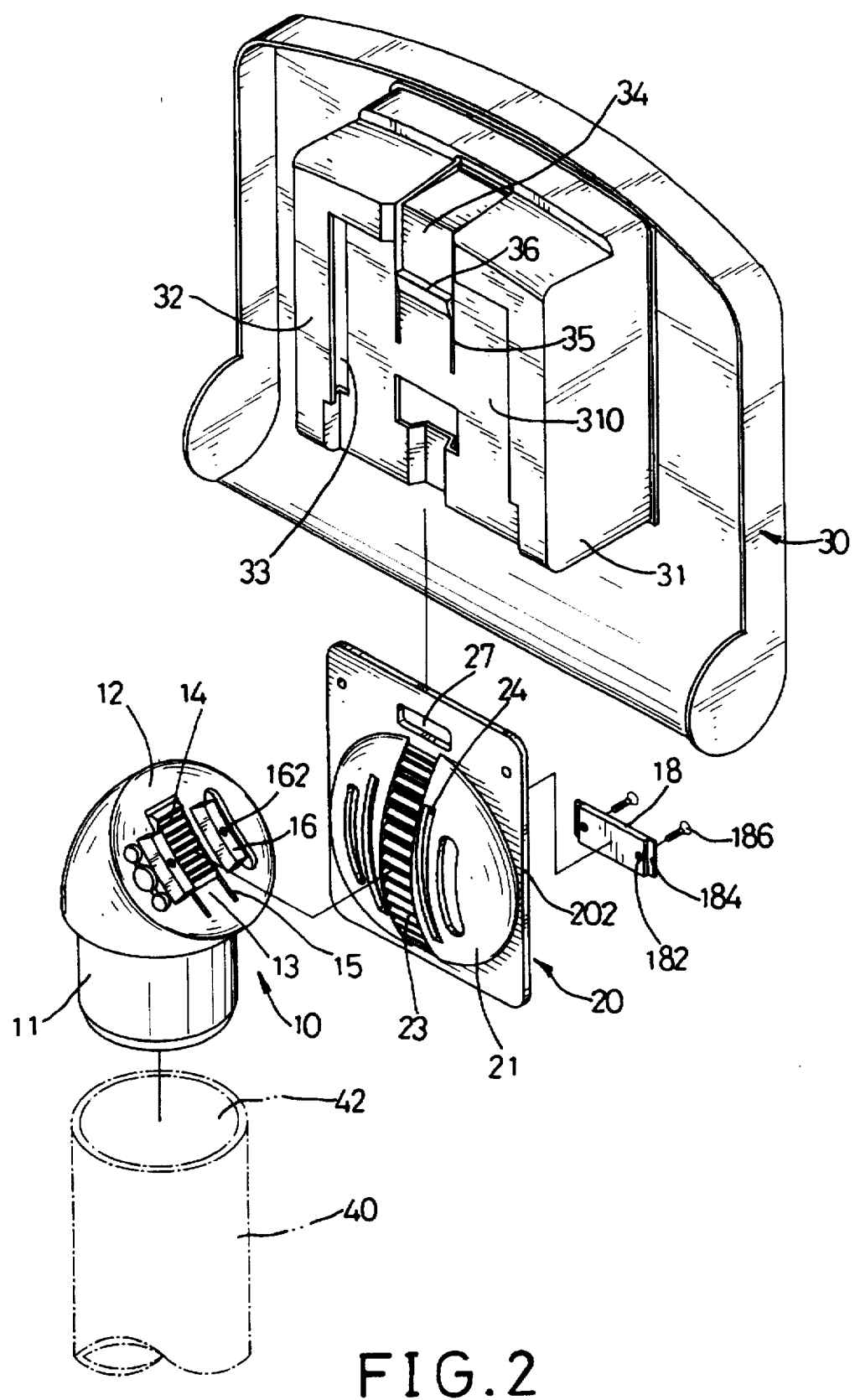
FIG. 2 is an exploded view of an adjusting device in accordance with the present invention.

Referring to the remaining drawings, and initially to FIGS. 1 and 2, an angle adjusting device in accordance with the present invention is provided for adjusting an inclined angle of an instrument panel 30 which is mounted on an exerciser (not shown) such as a running practicing machine, a rocking machine and the like and includes a top wall 38 with a display monitor 37 mounted thereon and a bottom wall 31.

The adjusting device comprises an adjusting plate 20 fixedly mounted on the bottom wall 31 of the instrument panel 30 and having a convex portion 21 with a first side facing the bottom wall 31 of the instrument panel 30 and a second side.

A plurality of first teeth 23 are serially arranged on the second side of the convex portion 21. Two spaced elongate slots 24 are each defined in the convex portion 21 and are each located adjacent to the plurality of first teeth 23.

A supporting socket 10 is pivotally mounted on the adjusting plate 20 and includes a concave portion 12 mating with the convex portion 21. The concave portion 12 is disposed in an inclined manner, and an included angle defined between the concave portion 12 and a horizontal axis is preferably equal to forty-five degrees.

The supporting socket 10 includes a lower plug portion 11 fitted in a passage 42 defined in an upright post 40 and having an annular groove 112 defined therein for receiving a top portion of the upright post 40 therein such that the supporting socket 10 can be securely mounted on the upright post 40.

A U-shaped slit 15 is defined in the concave portion 12 by which a resilient strip 13 is formed. A plurality of second teeth 14 are serially arranged on the resilient strip 13 of the concave portion 12 and each mesh with each of the plurality of first teeth 23. Preferably, a reinforced rib 132 is formed or mounted on an underside of the resilient strip 13.

Two spaced blocks 16 each protrude from the concave portion 12, each being located adjacent to the plurality of second teeth 14 and each slidably extending through a corresponding one of the two elongated slots 24.

A positioning plate 18 abuts on the first side of the convex portion 21 and is fixedly mounted on the two blocks 16 for fastening the adjusting plate 20 on the supporting socket 10 such that the adjusting plate 20 can be pivoted relative to the supporting socket 10 by means of a slidable engagement between each of the blocks 16 and each of the elongate slots 24.

Figure 3:
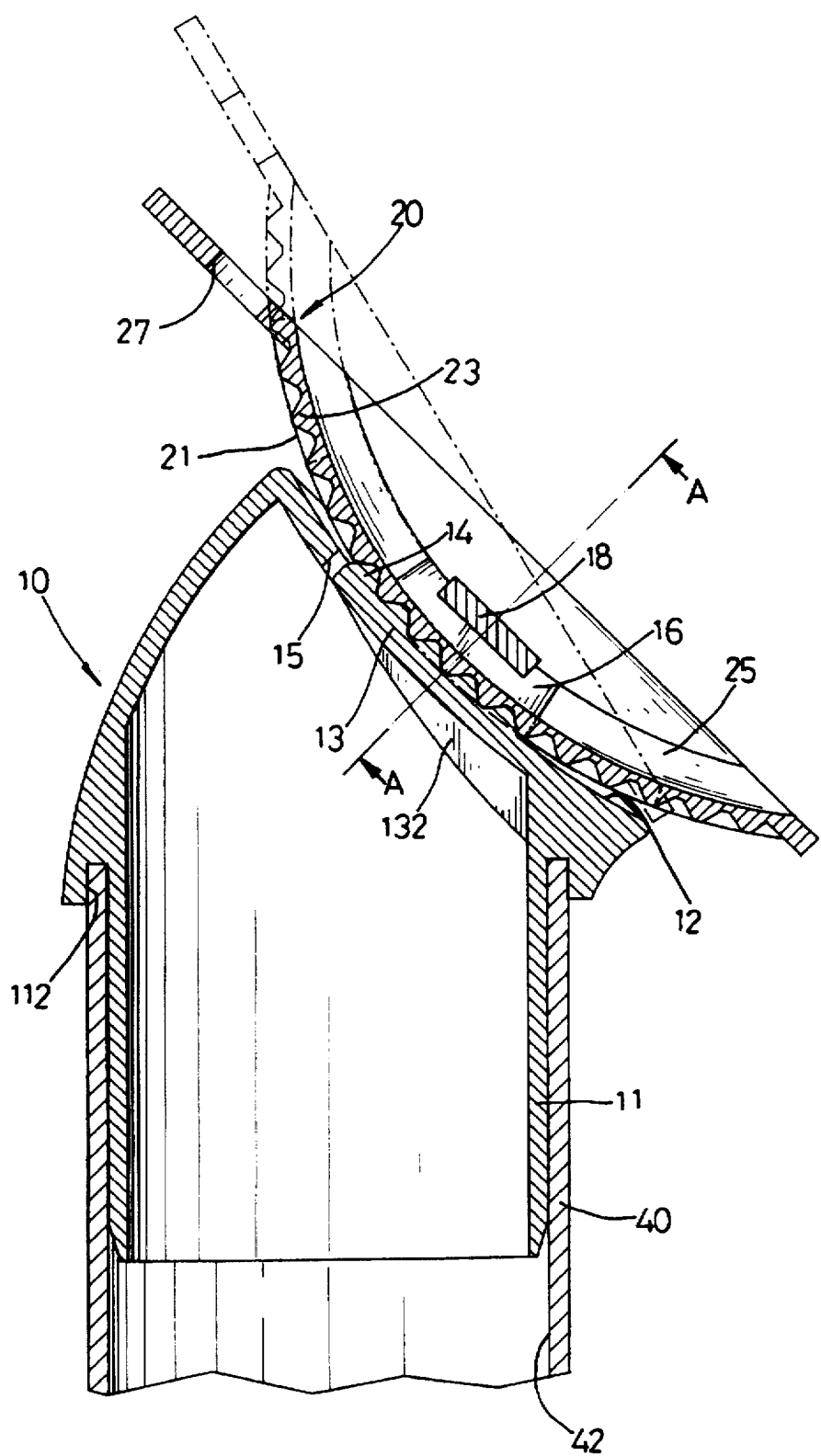
FIG. 3 is a side cross-sectional assembly view of FIG. 2.
Figure 4:
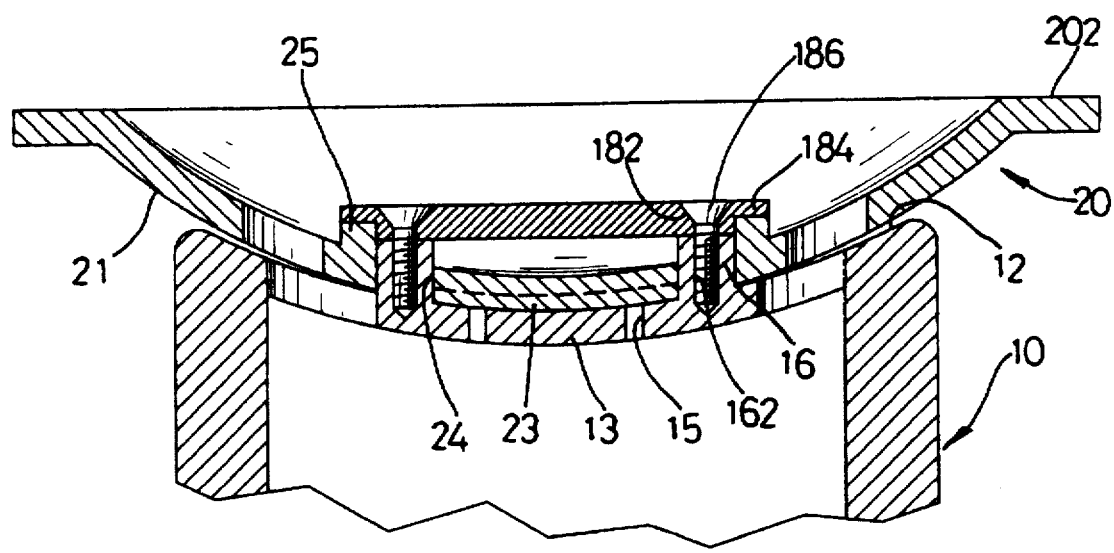
FIG. 4 is a cross-sectional view along a line A—A of FIG. 3.

Referring to FIGS. 2 and 3 with reference to FIG. 4, each of the two blocks 16 has a bore 162 defined by a threaded wall thereof. The positioning plate 18 has two holes 182 defined therein and each aligning with an associated bore 162. Two positioning screws 186 each extend through each of the two holes 182 and are each threadedly engaged in an associated bore 162, thereby fixing the positioning plate 18 on the two blocks 16.

Preferably, the adjusting plate 20 includes two spaced elongate ribs 25 each protruding from the first side of the convex portion 21 and each abutting on each of the two blocks 16. The positioning plate 18 includes two side edges 184 each rested on each of the two elongate ribs 25, thereby limiting each of the two ribs 25 by means of the two side edges 184 of the positioning plate 20.

The bottom wall 31 of the instrument panel 30 includes a receiving surface 310 having two edges each having an L-shaped flange 32 formed thereon. Each of the two flanges 32 has an elongate guiding groove 33 defined therein.

A snapping strip 34 similar to the resilient strip 13 is formed on the receiving surface 310 and is located between the two flanges 32. A substantially U-shaped slit 35 is defined along a periphery of the snapping strip 34. A hook 36 protrudes from the snapping strip 34 and is located in the U-shaped slit 35.

The adjusting plate 20 is slidably mounted on the receiving surface 310 and has two side edges 202 each stopped by each of the two flanges 32 and each received in an associated guiding groove 33. A cavity 27 is defined in the adjusting plate 20 for detachably receiving the hook 36 therein such that the adjusting plate 20 can be secured on the bottom wall 31 of the instrument panel 30.

In operation, referring to FIG. 3 with reference to FIG. 2, the adjusting plate 20 together with the instrument panel 30 can be pivoted on the supporting socket 10 by means of a slidable engagement between each of the blocks 16 and each of the two elongate slots 24 such that the inclined angle of the instrument panel 30 relative to the upright post 40 can be adjusted arbitrarily.

The plurality of second teeth 14 detachably meshing with the plurality of first teeth 23 can be used to provide an intermediary and intermittent positioning effect for retaining the adjusting plate 20 on the supporting socket 10.

It should be clear to those skilled in the art that further embodiments of the present invention may be made without departing from the scope and spirit of the present invention.

What is claimed is:

1. An angle adjusting device for an instrument panel (30) having a bottom wall (31) and comprising:

an adjusting plate (20) fixedly mounted on the bottom wall (31) of said instrument panel (30) and having a convex portion (21) with a first side facing the bottom wall (31) of said instrument panel (30) and a second side, a plurality of first teeth (23) arranged on the second side of said convex portion (21), two spaced elongate slots (24) each defined in said convex portion (21) and each located adjacent to said plurality of first teeth (23);

a supporting socket (10) pivotally mounted on said adjusting plate (20) and including a concave portion (12) mating with said convex portion (21), a plurality of second teeth (14) arranged on said concave portion (12) and meshing with each of said plurality of first teeth (23), two spaced blocks (16) each protruding from said concave portion (12), each located adjacent to said plurality of second teeth (14) and each slidably extending through a corresponding one of said two elongated slots (24); and a positioning plate (18) abutting on the first side of said convex portion (21) and fixedly mounted on said two blocks (16) for fastening said adjusting plate (20) on said supporting socket (10).

2. The angle adjusting device in accordance with claim 1, wherein each of said two blocks (16) has a bore (162) defined by a threaded wall thereof, said positioning plate (18) having two holes (182) defined therein and each aligning with an associated bore (162), two positioning members (186) each extending through each of said two holes (182) and each threadedly engaged in an associated said bore (162).

3. The angle adjusting device in accordance with claim 1, wherein said adjusting plate (20) includes two spaced elongate ribs (25) each protruding from the first side of said convex portion (21) and each abutting on each of said two blocks (16), and said positioning plate (18) including two side edges (184) each rested on each of said two elongate ribs (25).

4. The angle adjusting device in accordance with claim 1, wherein said supporting socket (10) includes a substantially U-shaped slit (15) defined in said concave portion (12), a resilient strip (13) defined by a periphery of said U-shaped slit (15), and said plurality of second teeth (14) being formed on said resilient strip (13) and located in said U-shaped slit (15).

5. The angle adjusting device in accordance with claim 1, wherein said concave portion (12) is inclined with a horizontal axis.

6. The angle adjusting device in accordance with claim 1, wherein said resilient strip (13) includes a reinforced rib (132) mounted on an underside thereof.

7. The angle adjusting device in accordance with claim 1, wherein the bottom wall (31) of said instrument panel (30) includes a receiving surface (310) having two edges each having an L-shaped flange (32) formed thereon, each of said two flanges (32) having a guiding groove (33) defined therein, a snapping strip (34) formed on said receiving surface (310) and located between said two flanges (32), a substantially U-shaped slit (35) defined along a periphery of said snapping strip (34), a hook (36) protruding from said snapping strip (34) and located in said U-shaped slit (35), said adjusting plate (20) being slidably mounted on said receiving surface (310) and having two side edges (202) each stopped by each of said two flanges (32) and each received in an associated said guiding groove (33), and a cavity (27) defined in said adjusting plate (20) for detachably receiving said hook (36) therein.

* * * * *